US008172975B2

(12) United States Patent
Chamandy

(10) Patent No.: US 8,172,975 B2

(45) **Date of Patent: *May 8, 2012**

(54) THERMAL TRANSFER MEDIA AND METHOD OF MAKING AND USING SAME

(75) Inventor: Paul A. Chamandy, Ithaca, NY (US)

(73) Assignee: Avery Dennison Corporation, Pasadena, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/881,781

(22) Filed: Jul. 30, 2007

(65) Prior Publication Data

US 2007/0289703 A1 Dec. 20, 2007

Related U.S. Application Data

(63) Continuation of application No. 11/412,744, filed on Apr. 28, 2006, now Pat. No. 7,368,029, which is a continuation of application No. 10/388,989, filed on Mar. 14, 2003, now Pat. No. 7,102,657.

(51) Int. Cl.

| | |
|---|---|
| ***B31C 1/00*** | (2006.01) |
| ***B65H 81/00*** | (2006.01) |
| ***B44C 1/17*** | (2006.01) |
| ***B29C 65/00*** | (2006.01) |
| ***B32B 37/00*** | (2006.01) |
| ***B32B 38/14*** | (2006.01) |

(52) U.S. Cl. ......... 156/240; 156/184; 156/277; 156/289

(58) Field of Classification Search .................... 156/60, 156/184, 185, 187, 191, 192, 230, 234, 235, 156/237, 238, 239, 240, 247, 249, 250, 269, 156/270, 277, 278, 289, 314, 324; 427/402, 427/407.1, 411, 412.1, 412.3, 416

See application file for complete search history.

(56) References Cited

U.S. PATENT DOCUMENTS

| | | | |
|---|---|---|---|
| 4,517,044 | A | 5/1985 | Arnold |
| 4,541,340 | A | 9/1985 | Peart et al. |
| 4,544,590 | A | 10/1985 | Egan |
| 4,828,638 | A | 5/1989 | Brown |
| 4,944,827 | A | 7/1990 | Lilly et al. |
| 5,196,030 | A | 3/1993 | Akerblom et al. |

(Continued)

FOREIGN PATENT DOCUMENTS

WO WO/2004/050262 A1 12/2003

OTHER PUBLICATIONS

U.S. Appl. No. 60/430,216, filed Dec. 2002, Tsai.

(Continued)

*Primary Examiner* — Philip Tucker
*Assistant Examiner* — Brian R Slawski
(74) *Attorney, Agent, or Firm* — Avery Dennison Corporation

(57) ABSTRACT

There is disclosed thermal transfer media containing both fixed and variable printed information, and method of making and using such a thermal transfer medium. The fixed information is printed in one or more fixed-information zone(s) preferably on a web during a long production run and thereafter as the need arises the variable information is printed or imprinted in one or more variable information zone(s) on sections of the web during shorter production runs. The transfer medium is particularly suited for printing onto fabrics that are subject to repeated home laundering and commercial dry cleaning.

11 Claims, 7 Drawing Sheets

U.S. PATENT DOCUMENTS

| | | | | |
|---|---|---|---|---|
| 5,464,289 | A | 11/1995 | Beaudry | |
| 5,480,704 | A | 1/1996 | Sogabe | |
| 5,489,359 | A * | 2/1996 | Yamane | 156/540 |
| 5,538,831 | A | 7/1996 | Oshima et al. | |
| 5,658,647 | A | 8/1997 | Magill et al. | |
| 5,661,099 | A | 8/1997 | Mitchell, Jr. | |
| 5,681,420 | A * | 10/1997 | Yamane | 156/387 |
| 5,707,475 | A | 1/1998 | Steidinger et al. | |
| 5,788,796 | A * | 8/1998 | Look et al. | 156/277 |
| 6,067,103 | A | 5/2000 | Ewert et al. | |
| 6,246,326 | B1 | 6/2001 | Wiklof et al. | |
| 6,296,022 | B1 | 10/2001 | Lowe | |
| 6,460,992 | B1 | 10/2002 | Boyd et al. | |
| 6,703,089 | B2 | 3/2004 | DeProspero et al. | |
| 2002/0000288 | A1 * | 1/2002 | Boyd et al. | 156/240 |
| 2005/0100689 | A1 | 5/2005 | He et al. | |

OTHER PUBLICATIONS

U.S. Appl. No. 60/453,661, filed Mar. 2003, Tsai.

Paxar Systems Group; Paxar 5000/Paxar5300/Paxar 5300ZT Operation/Maintenance and Parts List, Edition 6.1, Jan. 1995.

Paxar Systems Group; Paxar User's Manual; Model 5300ZT—Modified Addendum, Manual Edition 3.0, Feb. 14, 2003.

* cited by examiner

THERMAL TRANSFER MEDIA AND METHOD OF MAKING AND USING SAME

CROSS-REFERENCE TO RELATED APPLICATIONS

This application is a continuation of application Ser. No. 11/412,744, filed Apr. 28, 2006, now U.S. Pat. No. 7,368,029, which is a continuation of patent application Ser. No. 10/388,989, filed Mar. 14, 2003, now U.S. Pat. No. 7,102,657.

A related document is U.S. Pat. No. 7,151,552.

FIELD OF THE INVENTION

This invention relates to thermal transfer media and to methods of making and using thermal transfer media.

BACKGROUND OF THE INVENTION

The following prior art is made of record: U.S. Pat. Nos. 4,541,340; 4,828,638; 4,944,827; 5,464,289; 5,196,030; 5,658,647; 5,661,099; 5,707,475; 5,788,796; 6,067,103; 6,246,326; 6,296,022; and 6,460,992; and also Paxar 5300ZT Operation/Maintenance and Parts List, January 1995 and User's Manual Paxar Model 5300ZT-Modified Addendum Feb. 14, 2003.

SUMMARY OF THE INVENTION

The invention relates to improved thermal transfer media and to improved methods of making and using thermal transfer media. The transfer media of the invention are useful for transferring printing to a wide variety of flexible or rigid surfaces or substrates such as fabric, painted surfaces, metal, wood, plastics, composite materials, and so on.

It frequently happens that a product manufacturer will have a variety of products that need to be printed or marked with information, and that some of the information to be printed remains constant over many or all products in the product line while other information may vary from product-to-product within the product line. The information that is the same from product-to-product in the product line can be termed "fixed information" and the information that varies from product-to-product can be termed "variable information."

When the product manufacturer uses transfers to transfer printed information onto the products, without the present invention, the product manufacturer is required to use a different transfer containing both fixed and variable information for each different product within the product line. This requires each product manufacturer to stock tens, hundreds, or thousands of different transfers, one transfer for each different product, although the products may vary by only a small amount of information, for example a serial number, a date code, country of origin, and/or size, and so on. This can become an enormous burden and expense for both the transfer media manufacturer and the product manufacturers. The transfer media manufacturer has the burden and expense of generating, identifying, tracking, handling and perhaps storing or inventorying possibly a tremendous number of different transfers for each product manufacturer and each product manufacturer in turn has the burden and expense of identifying, tracking, handling, and storing or inventorying a tremendous number of transfers.

When using the transfers of the invention, the product manufacturer simply determines the fixed information and variable information and then again places an order for a transfer medium printed with only fixed information but which is capable of receiving any desired variable information. The transfer media manufacturer then generates a large number of transfers containing only fixed information, and thereafter variable information can be added either by the transfer media manufacturer upon instruction from the product manufacturer, or the variable information can be printed by the product manufacturers. In this way, the desired variable information is printed as needed.

While the information is described in connection with the application of transfers to fabrics or garments, there is no intention to thereby limit the invention. For example, a garment manufacturer may make many different garments in many different sizes. The garment manufacturer may find it necessary or desirable to mark the garments with information, such as a logo, material content, country of origin, washing instructions, bleaching instructions, ironing instructions, drying instructions, various types of codes including code numbers, and size. Frequently most or all this information except size is common to a large number of garments made by that garment manufacturer, however, it is possible for any or most of the normally fixed information to change. For example, a product manufacturer may make products in different countries so that country of origin information can be variable information, and so on.

A series of transfers or images disposed along the length of a transfer web can be partially printed or preprinted with the same information, namely, fixed information. Later, as the need arises, the partially printed transfer medium such as a transfer web can be printed with various additional variable information. For example, each printed image of fixed information on the transfer web can be supplemented with variable information, such as size information. A long web of transfer medium printed with fixed information produced in a long production run by a transfer media manufacturer can simply be wound into a large roll and subsequently printed with variable information or the long transfer medium with fixed information can be cut into shorter lengths and wound into two or more rolls which may be easier to handle and/or to distribute to different locations. The transfer medium of the invention can be printed with fixed information on a high volume basis in one location, for example the transfer media can be printed at the transfer media manufacturer's location, and thereafter the variable information can be printed on an as-needed basis at the same location or at different locations by various parties such as a subcontractor or the garment manufacturers themselves. It is not uncommon for a manufacturer such as a garment manufacturer to have different factories or locations where items requiring marking with both fixed and variable information are desired or required to be printed on a garment. The roll(s) of transfer media can be sent to these different factories or locations and the variable information can be printed there. The transfer medium of the invention is particularly suited to all these situations because previously prepared partially printed transfer medium containing only fixed information can be efficiently tailored to include variable information. When a fully printed transfer medium is needed, the large roll, or the small roll, as the case may be, of partially printed transfer medium is passed through a relatively low-cost, small footprint, short-run printer that prints all the variable information. For example, partially printed transfer medium on either a large or a small roll can be threaded into a short-run printer. The printer prints, for example, size information of one size, e.g., 2X/2XG, 50-52 on some or all of the images in the variable-information zones on the transfer medium in that roll. It may be that only part of the roll will need to be printed with variable information of the size indicated above, so some or all of the remainder of this transfer medium roll can be printed with information of a different size, e.g., size X/XL, 46-48. Thus, a length of transfer medium will have been printed with the same fixed information and differing variable information. This obviates the need for a large inventory of fully printed transfer media printed with both fixed and variable information. It should be noted that while large, expensive, long-run equipment suitable for long production runs can produce long webs of transfer medium, it is not well suited to produce short runs because such long-run equipment needs to be repeatedly stopped, changed over to print different variable information and restarted. This changeover results in some waste of transfer medium, and the more frequently the equipment needs to be stopped, changed over and restarted, the less efficient the equipment is. Also, such long-run equipment creates more waste than the above-described short-run printers.

According to the invention, the improved thermal transfer medium and improved method of making such a transfer medium containing both fixed and variable information can be used to apply printed information to a fabric, and the printed label is capable of undergoing repeated laundering. In one preferred embodiment, the fixed information is printed with a screen printing ink in a screen printing process, and the variable information is printed with a hot stamp ink in a hot stamp process. While screen printing processes are frequently referred to as silk screen processes, the screen material used today comprises other materials such as synthetic polyester. Therefore, the process is referred to as a screen process. Irrespective of the printing technology used, the inks should have the desired elasticity to perform well when applied to garments, which are inherently subject to stretching. It is also preferred to provide a protective coating having sufficient elasticity, which protects the printed information during laundering.

In particular in one embodiment, the improved thermal transfer medium is made by providing a carrier web, wherein one side of the carrier web has a release coating both in one or more fixed-information zone(s) capable of receiving fixed information and in one or more variable-information zone(s) capable of receiving variable information, optionally applying a protective coating over the release coating in the fixed information zone(s) and in the variable information zone(s), printing fixed information over any protective coating in the fixed-information zone(s), optionally applying a contrasting-color coating over the printed fixed information in the fixed-information zone(s), applying an adhesive coating both to the fixed-information zone(s) including over the printed fixed information and the protective coating and to the variable-information zone(s) including over the protective coating, printing variable information over the adhesive in the variable-information zone(s), and optionally printing a contrasting color over the printed variable information. If the color of the surface or substrate onto which the printing is to be transferred is light in color and assuming the ink is dark in color such as black, it may not be necessary or desirable to include a contrasting-color coating such as white in the transfer. Likewise, if the color of the surface onto which the print is to be transferred is dark in color such as dark blue or black and assuming the printing ink is light in color such as white, it may not be necessary or desirable to include a contrasting-color coating such as black in the transfer. However, if the product manufacturer desires the printing to be highlighted or if it is desired to print on a dark color substrate with a dark ink, then it may be desirable for the printing to have an underlying contrasting-color coating to provide an outline or a background for good readability of the printing. In addition, in instances where the garment or other product is not subject to washing, abrasion or other rough handling, the protective coating may be omitted. Also, if the printed information on a garment has sufficient color fastness without the protective coating or if a particular application does not require it, the protective coating can be omitted.

The invention provides a thermal transfer medium in which adhesive is used to bond the printed information to the fabric or surface, wherein the printed fixed information is between an adhesive coating and a release coating, whereas the adhesive is between the printed variable information and the release coating.

One specific embodiment of a thermal transfer medium for use in a hot stamp process includes a carrier web, a uniform release coating on the carrier web, a uniform adhesive coating on the release coating, and a uniform ink coating on the adhesive coating.

Other features and advantages of the invention will be apparent to those skilled in the art upon reference to the drawings and the following detailed description.

BRIEF DESCRIPTION OF THE DIAGRAMMATIC DRAWINGS

Figure 10:
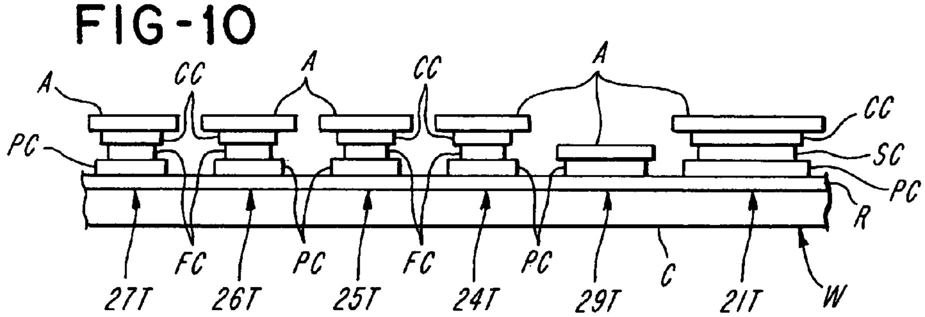
FIG. 10 is a sectional view of the various printing and coating layers, with cross-hatching omitted for the sake of clarity.
Figure 17:
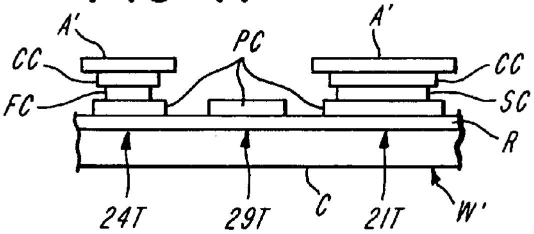
FIG. 17 is a fragmentary sectional view similar to FIG. 10, but showing an alternative embodiment of the partially printed thermal transfer medium, with cross-hatching omitted for the sake of clarity.
Figure 20:
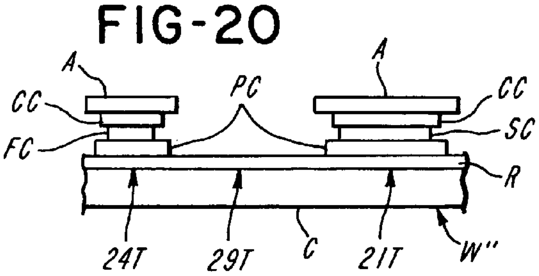
Figure 21:
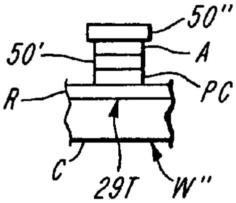

FIG. 20 is a fragmentary sectional view similar to FIGS. 10 and 17, but showing another alternative embodiment of the invention, with cross-hatching omitted for the sake of clarity; and FIG. 21 is a sectional view of a variable information zone showing adhesive, printing and a protective coating having been applied using a hot stamp ribbon, together with a contrasting-color coating, with cross-hatching omitted for the sake of clarity.

DETAILED DESCRIPTION OF THE PREFERRED EMBODIMENTS

Figure 1:
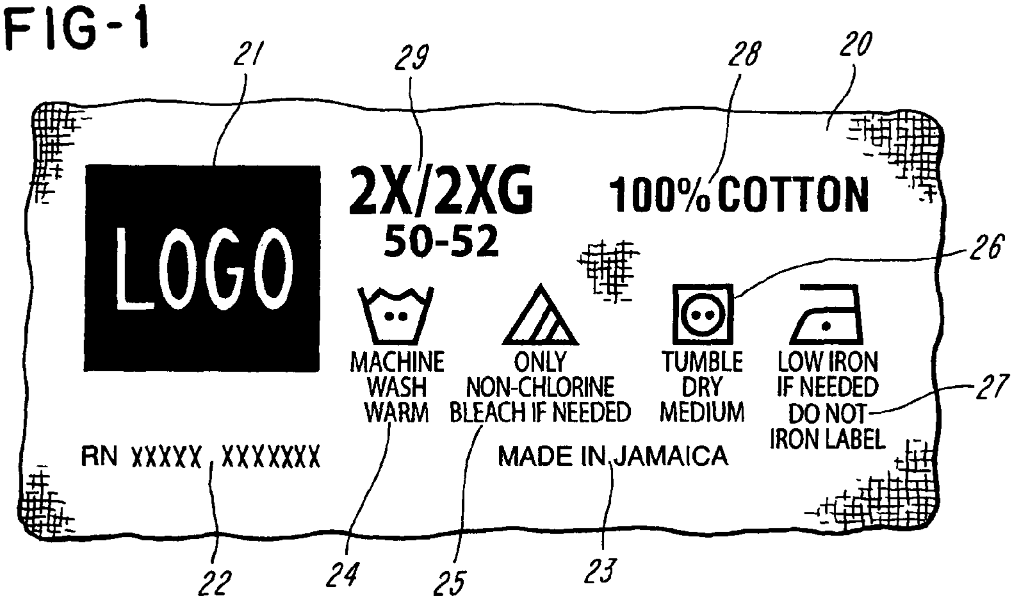
FIG. 1 is a top plan view of a fabric printed with a transfer medium in accordance with the invention.
Figure 15:
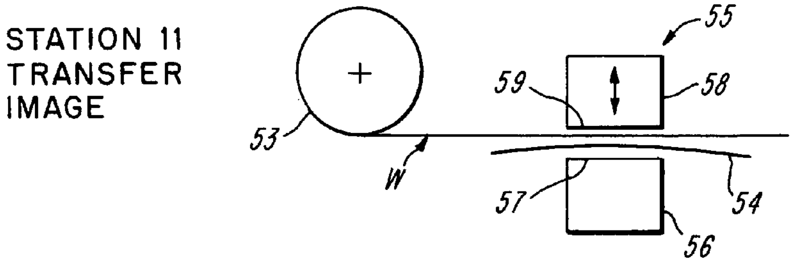
FIG. 15 is a side elevational view of Station 11 showing an arrangement for transfer printing onto a substrate, e.g., a fabric garment.

With reference to FIG. 1, there is shown a substrate such as a piece of flexible fabric 20 which may be part of a garment 54 (FIG. 15) and a complete image comprised of printed information which has been transferred directly onto the fabric 20 from a thermal transfer medium in accordance with the invention. As indicated above, the substrate can also be comprised of various other surfaces and materials. The printed information shown in FIG. 1 includes information common to various products made by one manufacturer, in this case a particular garment manufacturer. Thus, this information is termed "fixed information"which is shown in fixed-information zones 21 through 28. This particular manufacturer uses the same fixed information in connection with various sizes of garments. Therefore, the image also includes "variable information" in one or more variable-information zone(s) 29. Although in this example only one variable-information zone is illustrated, another or other variable information zones can be provided. As shown, the zone 21 bears the manufacturer's logo or other identification, the zone 22 contains the manufacturer's code, zone 23 contains the country of origin of the garment, zone 24 contains washing instructions, zone 25 contains bleaching instructions, zone 26 contains drying instructions, zone 27 contains ironing instructions and zone 28 contains material content information. Variable information zone 29 contains size information.

Figure 2:
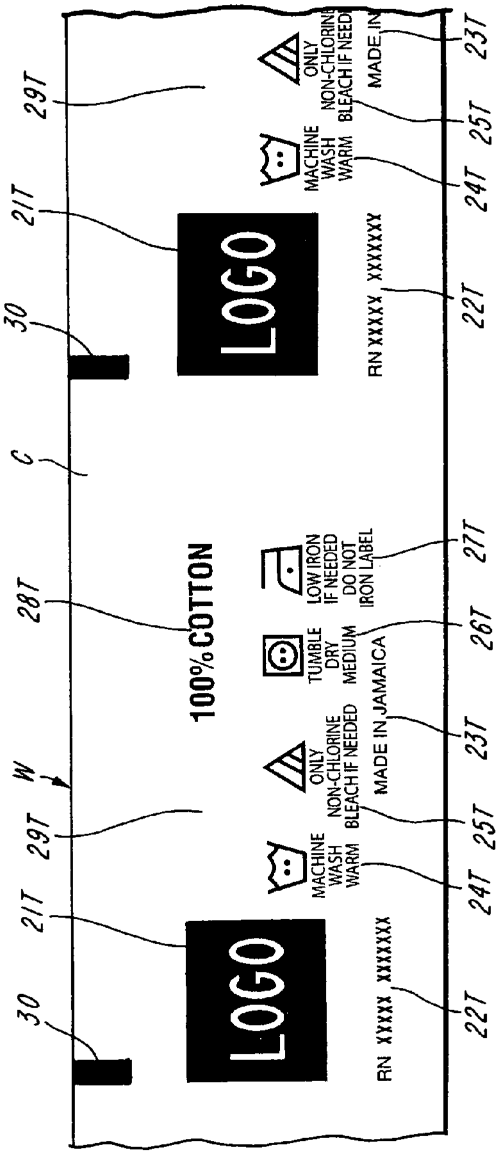
FIG. 2 is a top plan view through the carrier-web or film side of a partially printed transfer medium printed with fixed information.

FIG. 2 shows a thermal transfer web W partially printed with fixed information in fixed-information zones 21T through 28T and variable-information zone 29T is free of variable information. The zones 21T through 29T correspond exactly to the zones 21 through 29 of FIG. 1. The web W is also printed with registration marks 30 at equally longitudinally spaced apart intervals corresponding to the images on the thermal transfer web W. The images are repeated in the longitudinal direction along the web W.

Figure 3:
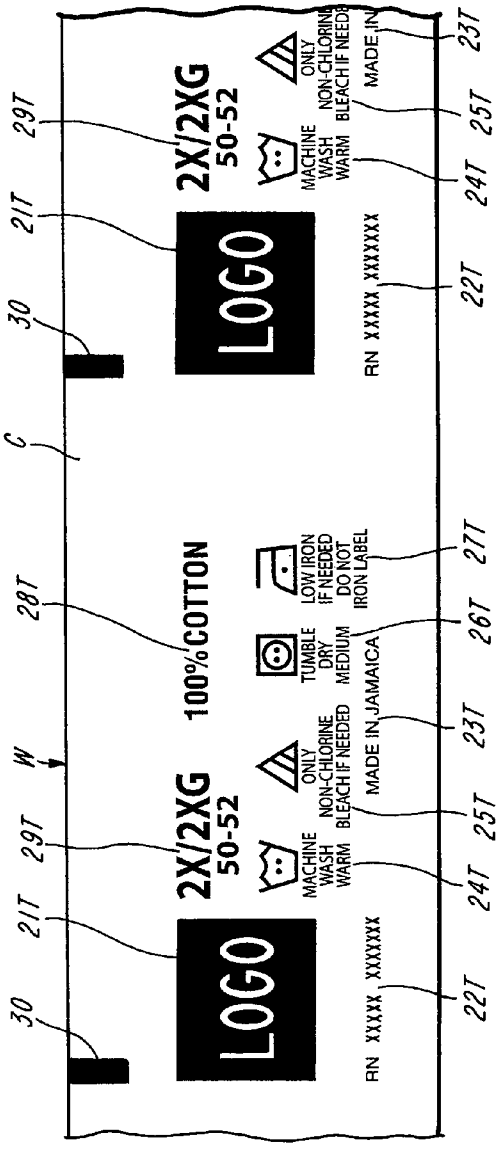
FIG. 3 is a fully printed transfer medium printed with both fixed and variable information.

FIG. 3 is like to FIG. 2 except that FIG. 3 contains variable printed information in the variable-information zone 29T.

Figure 4:
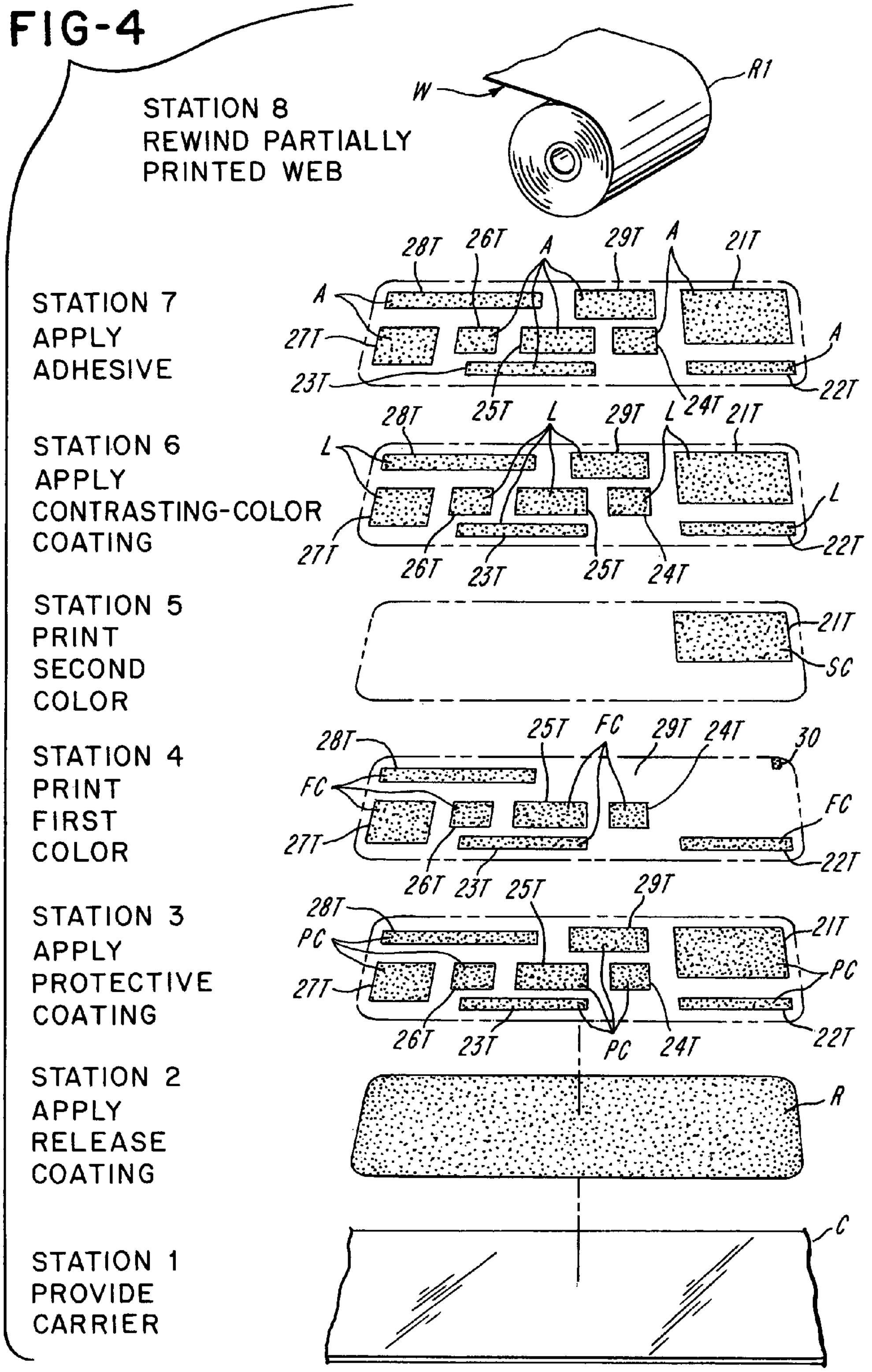
FIG. 4 is an exploded a perspective view showing various stations in making a thermal transfer medium in accordance with the invention, wherein the printed information and coatings are shown in general block form for the sake of clarity.
Figure 5:
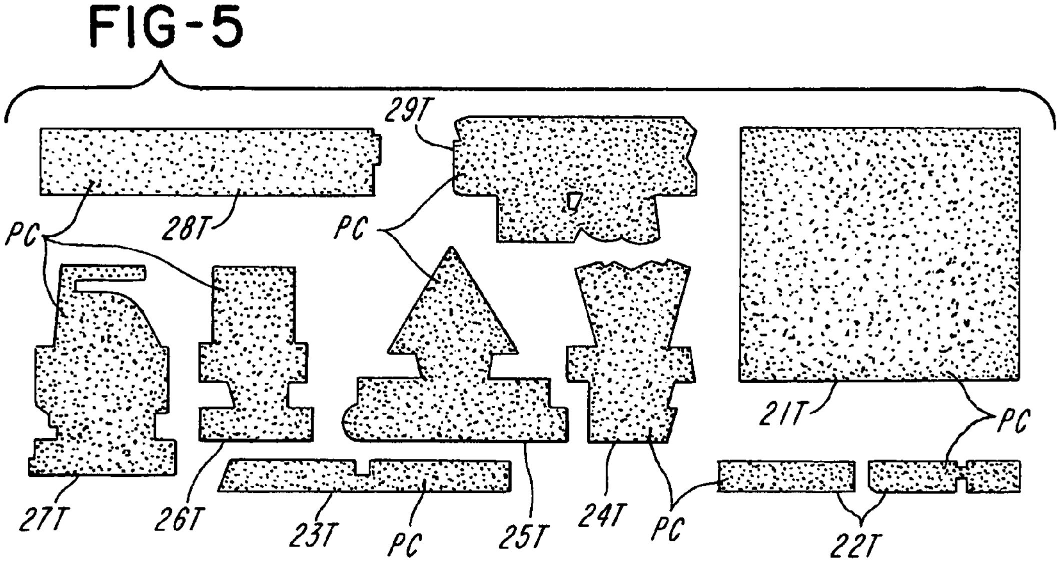
FIG. 5 is an enlarged top plan view of one of the coatings, namely the protective coating, which is applied over a release coating.

With reference to FIG. 4, there is shown Station 1 which shows providing a flexible carrier preferably in the form of a carrier web C which had been wound into a roll. The carrier web C can be plastic or cellulose-based. Non-limiting examples of carrier web C include polyester or polypropylene films and papers. In the case of silicone or wax-treated papers, the step of applying a release coating R can be omitted. Station 2 shows that for each image a release coating R is applied onto or over the upper surface of the carrier web C. Release coating R can be any release coating known to persons skilled in the art. A typical release coating R can comprise a waxy substance that softens or melts to facilitate release of the material to be transferred. The release coating R can be applied at a thickness of about 0.1 to about 1 thousandths of an inch, and preferably about 0.2 to about 0.8 thousandths of an inch, after drying. Station 3 shows that a protective coating PC is applied onto or over the release coating R in each of zones 21T through 29T. The pattern of the protective coating PC is better illustrated in FIG. 5, and as shown the pattern is printed in reverse. As used herein, the term "protective coating" refers to a coating that protects the printed information and is sufficiently transparent such that the printed fixed and variable information can be read by example through the coating PC. The protective coating can be clear or colorless, or it can be tinted or colored, so long as the desired printed fixed and variable information can be read for example by an individual. It is preferred that the protective coating PC be composed of or include an ink which is preferably like ink used for printing the fixed information, but is free of pigment. An important property of the protective coating is flexibility when the image is to be transferred to a flexible and/or stretchable substrate or surface such as a fabric garment. After application to a garment, the resulting thermal transfer or image will undergo deformation, for example, when the garment is put on or taken of, or washed. Therefore, in this application the protective coating is sufficiently flexible or elastic to deform. For example, the protective coating should desirably be able to conform at least 25 percent, and up to about 400 percent, in any direction without forming cracks or other imperfections. Also, the protective coating should have sufficient "memory" to return to the original size and shape after the deforming force is removed. Like the release coating R, the protective coating PC is preferably at a thickness of about 0.1 to about 1, and preferably about 0.2 to 0.8 thousandths of an inch, after drying. The chemical composition of the protective coating PC is not limited, as long as the coating has the above-described elasticity in connection with use on garments. In the event the transfer or image is applied to a solid or rigid surface which does not deform or stretch as indicated above, or the protective coating is not required to have all the above characteristics.

Figure 6:
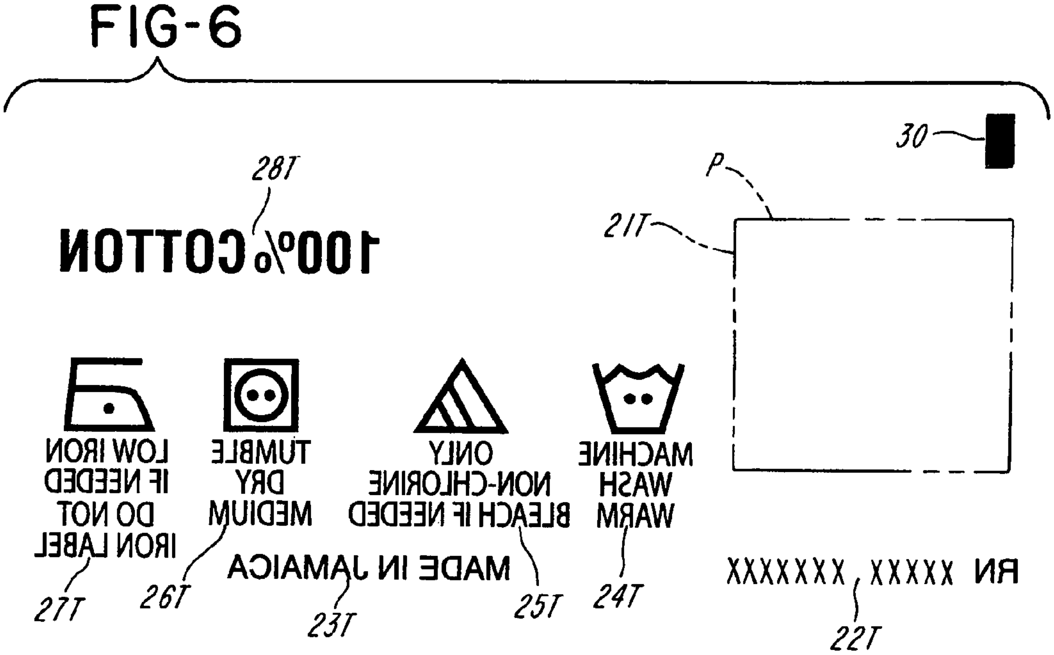
FIG. 6 is a top plan view of the printed fixed information in a first color which is applied over the protective coating.
Figure 7:
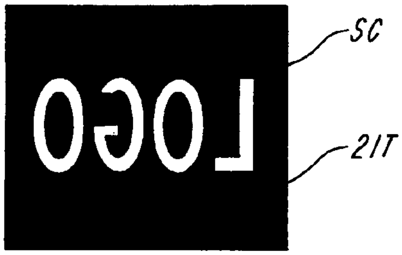
FIG. 7 is a top plan view of additional printed fixed information, e. g. a logo, in an optional second color.

Station 4 shows that a first color FC, e.g. black, is printed in zones 22T through 28T. The printing which is done in reverse is shown in FIG. 6. The printing in FIG. 6 in zones 21T through 28T falls just within the pattern shown in FIG. 5. Therefore, all the printing will always be entirely over the protective coating PC even though registration between the protective coating and the printing is not perfect but within reasonable tolerances. The registration marks 30 are printed at the time the fixed information printing FC is done. Station 5 illustrates printing in a second color SC, e.g. red, in the fixed-information zone 21T. Further details of the printing in zone 21T is shown in FIG. 7. FIG. 6 shows a phantom outline P where the printing of FIG. 7 will occur at zone 21T. In the event that all fixed information is in one color, e.g. black, then Station 5 is eliminated. Alternatively, if there is printing in more than two colors, additional printing stations can be added. In the event one or two contrasting-color coatings or printing CC are desired, they are applied at Station 6 aligned with but preferably slightly larger than any printing applied in Stations 4 and 5 so that the printing is more readily visible. When the article to which the transfer medium is to be applied is comprised of a fabric, the ink used is preferably wash resistant such that none of the printed information is destroyed, disturbed or otherwise affected after repeated washing of the garment. The characteristics of the ink can vary according to the surface to which the transfer is to be applied, and/or to the type of printing technique which is used to print the information. The ink should preferably have the same elasticity as the protective coating PC when the transfer is used to print onto fabric garments.

Next a coating of adhesive A is applied in zones 21T through 29T at Station 7. Any suitable adhesive A can be used, and the characteristics may vary depending on the nature of the surface or substrate to which the transfer is to be applied. For example, in the event the transfer is to be applied to a garment, the adhesive A is preferably about 1 to about 5, and most preferably about 1.5 to about 4 thousandths of an inch in thickness, after drying. When the transfer is applied to a fabric, the adhesive A is not limited but it should have the elastic properties of the protective coating PC and the ink or inks which comprise the fixed and variable printing. The profile of the area of adhesive A is slightly larger than the profile of the area of the protective coating in zones 21T through 29T. The adhesive A is a heat-activated adhesive that is wet when applied but which dries so that it is dry to the touch. In that the printed variable information 29 in the variable-information zone 29T is under the adhesive A after the printed variable information 29 has been transferred to the intended substrate, it is necessary that the adhesive A be clear enough so that the printed variable information 29 in the variable information-zone 29T can be read through the adhesive A. Therefore, the clearer the adhesive A the better. This is in contrast to the printed fixed information 21 through 28 in the fixed-information zones 21T through 28T after the printed fixed information has been transferred to the intended substrate, because the adhesive A is under the printed fixed information 21 through 28. Therefore, in the fixed-information zones 21T through 28T, the clarity of the adhesive A does not affect the readability of the printed fixed information 21 through 28. However, in the case of both the fixed information 21 through 28 and the variable information 29 it is not usually desirable to use an adhesive A that is highly visible because it provides an unnecessary background which may not be desired. In one alternative embodiment, the amount of adhesive A is less per unit area in the variable-information zone 29T than in the fixed-information zones 21T through 28T so that the printed variable information, when transferred onto the substrate, is more highly visible through the adhesive A. Ways of providing less adhesive A per unit area in the variable information zone 29T are to make the adhesive A in the variable-information zone 29T uniform but thinner than in the fixed-information zone 29T, or the adhesive A can be variegated.

The relative overlapping between the release coating R, the protective coating PC, the printed first color FC, the printed second color SC, the contrasting-color coating CC, and the adhesive coating A is best illustrated in FIG. 10. FIG. 10 shows that the release coating R has a larger profile or area than the profile of the protective coating PC, that the protective coating PC has a larger profile or area than the printing FC and SC, and that the profile or areas of the adhesive A are greater than that of the protective coating PC. Following the application of the adhesive A, the partially printed web W is wound into a roll R1 as shown at Station 8. It is noted that the partially printed web W is flexible and dimensionally stable so that it can be rolled and unrolled as needed and the transfers or images it contains can be readily applied to contoured surfaces or to yieldable materials such as fabrics or garments. The web W can also be used to transfer images onto fabric tape.

Figure 8:
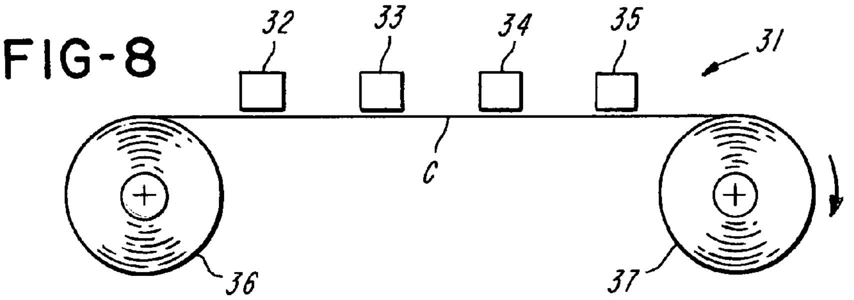
FIG. 8 is a side elevational view showing equipment with a sequence of coating and printing stations.
Figure 9:
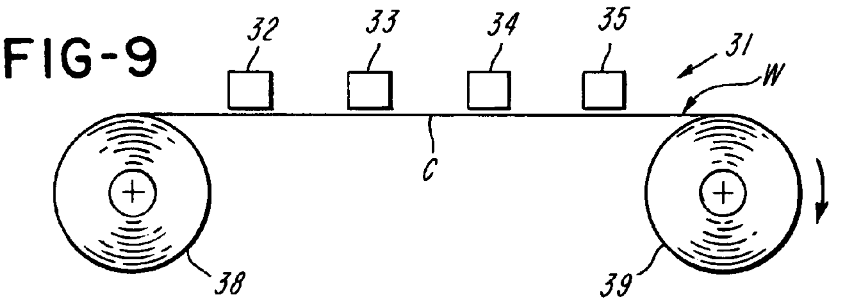
FIG. 9 is a side elevational view similar to FIG. 8.

With reference to FIG. 8, there is diagrammatically illustrated long-run equipment 31 with stations 32 through 35 for roll-to-roll printing and coating. A carrier in the form of a carrier web C wound into a roll 36 passes successively to stations 32 through 35 after which the carrier web C is wound into a roll 37. The carrier web C is preferably flexible, protective and clear or sufficiently transparent film so that the location of the printed information, and preferably the printing itself, is visible through the carrier web or film from the carrier-web or film side. This is useful when registering the transfer or image with the product to which transfer or image is to be applied. The stations 32 through 35 in the illustrated embodiment are equipped to be printing and coating stations. In this illustrated embodiment the printing and coating stations 32 through 35 are screen printing stations, although other printing techniques described herein can be used at these stations. There is a drier (not shown) after each station 32 through 35 so that the printing and/or coating applied at each station is dried before the web C reaches the next station and before the web C is wound into roll 37 or 39. The station 32 applies the release coating R at each zone 21T through 29T for each image to be printed with information. Alternatively, the entire upper face of the carrier C can be coated with a continuous uniform release coating R or the release coating may have been applied to the carrier web C before the carrier web C is loaded into the equipment 31. As shown, the release coating R can be applied at station 32 in the pattern shown in FIG. 4 at equally spaced intervals. In particular, the release coating R is shown to be generally a rectangle which covers all of zones 21T through 29T. The station 33 in FIG. 8 applies a protective coating PC over the release coating R in the pattern as shown in FIG. 4 and as shown in greater detail in FIG. 5. The station 34 prints the fixed information shown in FIG. 6 is a first color FC over the fixed-information zones 21T through 28T for each image. The station 35 prints the fixed information shown in FIG. 7 in a second color SC in the fixed information zone 29T for each image. After the carrier web C has been wound into the roll 37, the carrier web C is rewound to provide a roll 38 shown in FIG. 9. For a further pass of the carrier web C, the stations 32 through 35, or some of them, are set up to add further desired coatings and/or printing. As the carrier web C is unwound from the roll 38 it passes again to the print stations 32 through 35 in succession. At the station 32 (FIG. 9), a contrasting-color coating CC can optionally be applied. If two contrasting-color coatings CC are to be applied, then the station 33 can be used to apply a second contrasting-color coating CC. If only one contrasting-color coating CC is to be applied, then the station 33 can be used to apply an adhesive coating A at zones 21T through 29T. If the station 33 was used to apply a second contrasting-color coating, then station 34 will be used to apply the adhesive coating A. From there the partially printed thermal transfer web W is wound into a roll 39. The coatings and printing that have been applied to the carrier web C are dry to the touch.

FIG. 10 shows the various layers of coating and/or printing that have been applied to the partially printed transfer web W, however, only zones 21T, 24T, 25T, 26T, 27T and 29T are shown. The first layer is the film of carrier web C. The second illustrated layer is the release coating R. All the zones 21T through 29T including illustrated zones 21T, 24T, 25T, 26T, 27T and 29T have layers comprised by the carrier web C, the release coating R and protective coating PC. In another layer, the illustrated zones 24T, 25T, 26T and 27T as well as the other fixed information zones have printed fixed information in a first color FC typically black and the zone 21T also has printed fixed information in a second color SC, for example, red. Over the printing FC and SC is at least one layer as shown and possibly two layers of contrasting-color printing CC in illustrated zones 21T, 24T, 25T, 26T and 27T as well as the other fixed information zones. Over the contrasting-color layers CC in zones 21T through 28T including illustrated zones 21T, 24T, 25T, 26T and 27T and over the protective coating in zone 29T, is the adhesive coating A. The thicknesses of the layers have been exaggerated for clarity. In reality all of the coatings are thin. It should be noted that the pattern of protective coating PC applied over the release coating R is wider than the printing FC and SC. This assures that if the printing is slightly out of registration it will still be aligned with the protective coating PC. Next, the profile or pattern of contrasting-color coating CC should be slightly larger than or overlap the printing FC and SC, but preferably smaller than the profile or pattern of the protective coating PC. The profile or pattern of the adhesive A is at least slightly larger than the profile or pattern of the protective coating PC.

Figure 11:
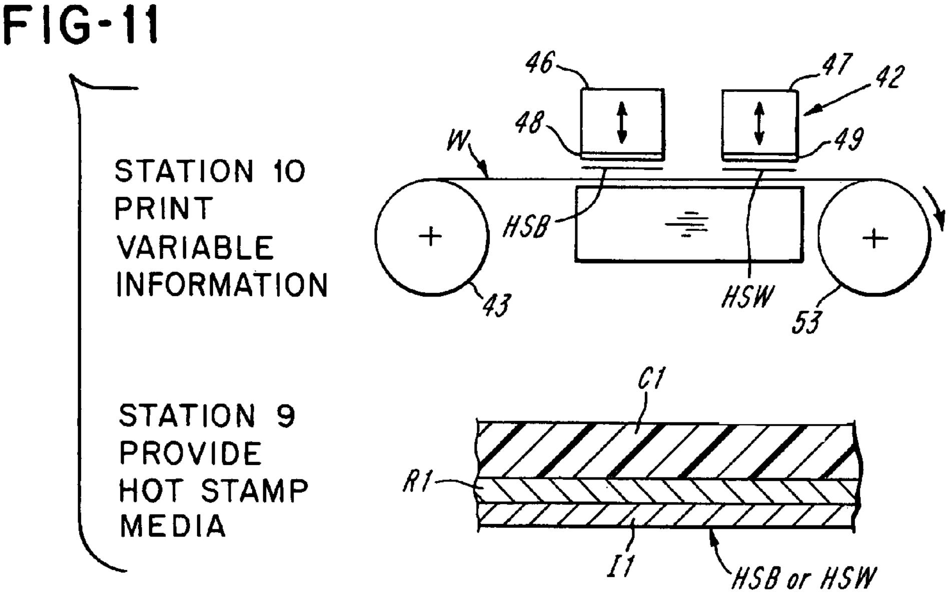
FIG. 11 is a side elevational view showing Stations 9 and 10 of the transfer medium making method.
Figure 14:
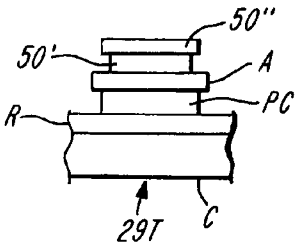
FIG. 14 is a sectional view of the layers in a fully printed variable information zone, with cross-hatching omitted for the sake of clarity.
Figure 13:
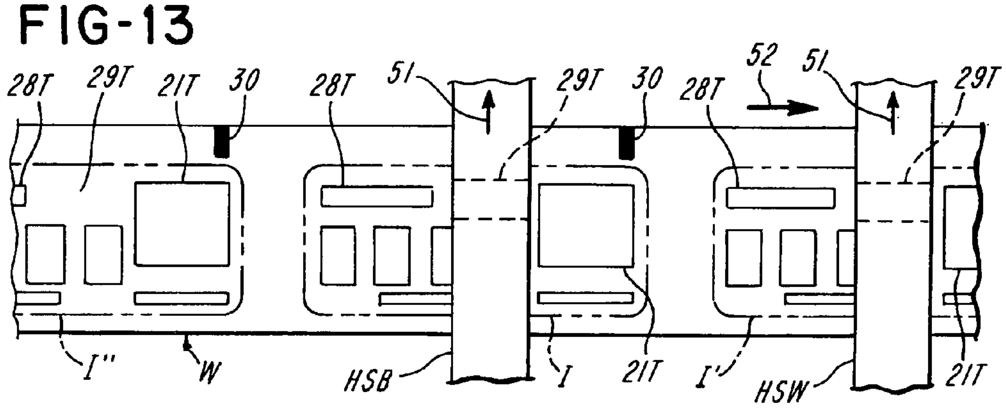
FIG. 13 is a top plan view showing the manner in which the variable printed information and the contrasting-color coating are applied to the partially printed thermal transfer medium.

The partially printed thermal transfer web W is now ready to be printed or overprinted with variable information. With reference to FIG. 11, the user can use any suitable printer such as a known printer 42 to print the variable information. The printer 42, Model 5300ZT-Modified produced by Paxar Americas, Inc., can be provided with a web WSB and also a second web HSW of hot stamp medium each one of which is shown to comprise a carrier in the form of a flexible carrier web C1, a uniform release coating R1, and a uniform ink I1 in a color such as black or if a background color is also to be printed, a contrasting color such as white. In instances where only printing without a contrasting-color background is required, only a hot stamp medium HSB in one color ink, such as black, is used. In instances such as illustrated, a hot stamp medium HSW with ink in a light color, such as white, is also provided. The partially printed web W from a roll 43, which has been rewound from the roll 39, is passed over a platen 44 of the machine 42, as shown. A hot stamp ribbon HSB bearing a dark color ink, e.g., black, is positioned to advance transversely to the direction of travel of the web W, and likewise a hot stamp ribbon bearing a light color ink, e.g., white, is positioned transversely to the direction of travel of the web W. Hot stamp print heads 46 and 47 are located opposite the platen 44. The print heads 46 and 47 carry replaceable hot stamp plates 48 and 49 or chases with printing type (not shown) which typically bear raised indicia 50 for printing or more particularly imprinting or hot stamping variable information onto the web W. In the illustrated embodiment, the indicia 50 on the plates 48 and 49 are similar except that the indicia on the plate 49 have a broader profile or footprint than the indicia 50 on the plate 48, so that the printing made by the plate 49 overlaps the printing made by the plate 48 to provide a contrasting-color background. The web W is brought to rest while the movable print heads 48 and 49 stamp the variable information onto the partially printed web W. Thereafter, the print heads 46 and 47 move away from the platen 44 to enable the hot stamp media HSB and HSW to be advanced in the direction of arrows 51. The print heads 46 and 47 are spaced so that the variable-information zones 29T of image I and identical image I' are printed simultaneously. The print heads 46 and 47 are registered with adjacent images I and I' and preferably move in unison. The spacing of the printing plates 46 and 47 is also the same as the spacing of registration marks 30. The variable information of image I is printed with, e.g. black ink, while the same variable information of image I' is printed with, e.g., white ink. It is noted that the W is advanced stepwise in the direction of arrow 52 following printing. Image I" has no variable information in zone 29T. The zones 29T of images I and I' are printed simultaneously by the print heads 46 and 47 (FIG. 13). As best shown in FIG. 14, the printed variable information or indicia 50' printed by the hot stamp medium HSB in zone 29T is applied over the adhesive A, and has a smaller profile than the adhesive A; and the contrasting-color 50" printed by hot stamp medium HSW in zone 29T can have a larger profile than the printing 50' but a smaller profile than the adhesive A or the protective coating PC.

Figure 16:
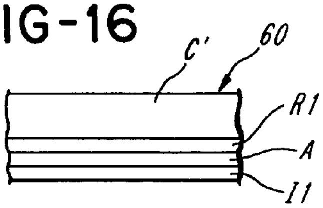
FIG. 16 is a fragmentary sectional view showing an alternative embodiment of a web of hot stamp medium by which variable printed information and adhesive can be hot stamped onto the partially printed thermal transfer medium.
Figure 18:
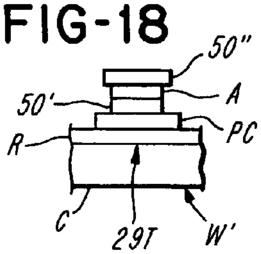
FIG. 18 is a sectional view of a variable information zone showing adhesive and printing having been applied using a hot stamp ribbon, together with a contrasting-color coating, with cross-hatching omitted for the sake of clarity.

The fully printed web W produced by the printer 42 is wound into a roll 53. The printed information is dry to the touch. The web W can be used directly from the roll 53 to transfer the images one-by-one onto separate garments, e.g., the garment 54 shown in FIG. 15, or the web W can first be rewound from the roll 53, depending upon the construction of the transfer machine. A transfer machine 55, shown diagramatically in slightly exploded form in FIG. 15, has a platen 56 with a platen surface 57 on which the garment 54 is placed and with which the garment 54 and the web W are registered. The fully printed web W with the carrier-web or film side up is passed between the garment 54 and a heated anvil 58 having a surface 59. The heated anvil 58 can move toward and away from the platen surface 57 so that the printed image, which has been registered with the garment 54, is transferred by heat and pressure from the carrier web C to the garment 54. The heat from the platen 58 softens or melts the release coating R so that the remainder of the coatings and printing such as PC, FC, SC, A and the printing 50' and 50" made from ribbons HSB and HSW are transferred onto the garment 54. In so doing the adhesive A is activated and becomes tacky and holds or bonds the transferred coatings and printed information to the garment 54. Once applied, the adhesive A is no longer tacky. FIG. 16 shows an alternative form of thermal transfer medium, particularly hot stamp medium 60, having a flexible carrier web C', a uniform release coating R1, a uniform adhesive coating A and a uniform ink coating I1 which can be used to print variable information on web W' in the variable information zone 29T over the protective coating PC. Ink I1 and adhesive A corresponding to the indicia 50 will be hot stamped over the provisionally applied protective coating PC. The resulting layering in the variable-information zone 29T provides carrier web C, release coating R, protective coating PC, printing 50' and adhesive A as shown in FIG. 18. Contrasting-color printing 50" also shown in FIG. 18 can be applied by a thermal transfer hot-stamp ribbon like the ribbon HSW.

In the embodiment of FIG. 17 there is no coating of adhesive A on web W' in the variable-information zone 29T. As seen in FIG. 17, the zone 29T has a layer of a carrier web C, a layer of a release coating R and a layer of a protective coating PC. When variable information is printed on the transfer medium web W' in the FIG. 17 embodiment by a printer such as in the printer 42, the hot stamp medium 60 shown in FIG. 16 is used. Simultaneously adhesive A and ink I1 from the hot stamp medium 60 are transferred onto the protective coating PC in zone 29T by the heated printing plate 48. In particular, the printing 50' and the adhesive A as shown in FIG. 18, applied simultaneously to the protective coating PC, will correspond to the indicia 50 on the printing plate or printing type on the plate 48. The adhesive A and the printing 50' have the same profile. Any printing 50" has a larger profile than the adhesive A and printing 50' but a smaller profile than the protective coating PC, as shown in FIG. 18. In other respects the completely printed web W' is like the web W.

Figure 19:
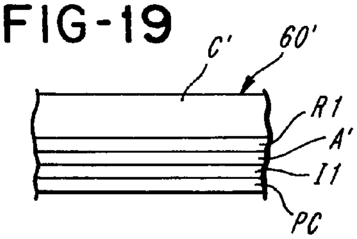
FIG. 19 is a fragmentary sectional view showing another alternative embodiment of a web of hot stamp medium by which variable printed information can be hot stamped onto the partially printed thermal transfer medium, with cross-hatching omitted for the sake of clarity.

FIG. 19 shows another alternative form of thermal transfer medium, particularly a hot stamp medium 60' which can be used to print variable information in the variable-information zone 29T directly onto an alternative form of a partially printed release coated web W" as shown in FIG. 20. In the embodiment of FIG. 20, there is no coating of adhesive A or protective coating PC in the variable information zone 29T on the web W". When the variable information is printed by the printing plate 48 using the transfer medium 60', then the protective coating PC, the variable information printing 50' and the adhesive A are transferred simultaneously directly onto the release coating R in the configuration of the indicia 50 as shown in FIG. 21. The adhesive A, the printing 50' and the protective coating PC have the same profile. Any printing 50" has a larger profile than the adhesive A, the printing 50' and protective coating PC as shown in FIG. 21. In other respects the web W" is like the web W.

Figure 12:
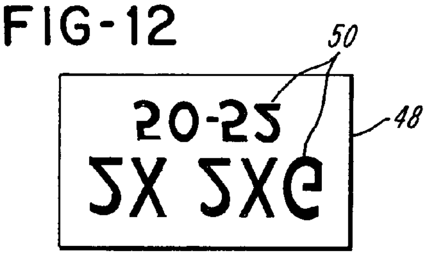
FIG. 12 is a bottom plan view of one of the hot stamp printing plates shown in FIG. 11.

It should be noted that the partially printed web W, W' or W" can be printed with different information simply by inserting into the printer 42 one or both printing plates 48 and 49 with the desired indicia. For example, the plate 48 shown in FIG. 12 can be replaced by a similar plate bearing indicia X/XL, 46-48 in reverse. It should also be noted that when the webs W' and W" have transferred images onto the substrate such as the garment 54, the adhesive A underlies the printing 50' and any printing 50" so there is no need for the adhesive A to be clear or transparent enough to enable the printing 50' to be read, however, if there is any contrasting-color printing 50" that contrasting-color printing 50" still needs to be seen so the adhesive A needs to be sufficiently transparent.

It should be noted that the printing of fixed and variable information can be performed by various printing techniques, although the printing techniques of screen printing for printing the fixed information and hot stamp printing for printing the variable information are preferred. Other usable techniques include, thermal transfer printing having a print head with a line of closely spaced heating elements used with a thermal transfer ribbon, ink jet printing, flexographic printing, laser printing, and so on.

The ink I1 can have the same characteristics following printing as the ink in the printed information in zones 21T through 29T applied by the equipment 31 and likewise the adhesive A applied from ribbons 60, 60" HSB, and HSW can have the same characteristics as the adhesive A applied by the equipment 31.

When a hot stamp process is used, the ink is embossed or is driven into the adhesive A to provide hot-stamped embossments in accordance with the raised indicia 50 on the printing plate 48 so even if the essentially transparent adhesive A would present a very slight diminution of visibility or readability of the printing, the hot stamp process makes the printing even more vibrant and visible than in the event certain other techniques for printing on the adhesive A are used.

In the event it is desired to produce a transfer medium web W, W', or W" with information such as country of origin 23 or material content 28 in addition to size 29 being variable information, then zones 23T and/or 28T and 29T can be printed in the printer 42 after the partially printed transfer medium W, W' or W" is produced, and in that event suitable printing plates tailored to print all such variable information will be used.

Although coatings R, PC, A are referred to, these coatings can be and are applied by screen printing and therefore, they can be considered to be printed.

Other embodiments and modifications of the invention will suggest themselves to those skilled in the art, and all such of these as come within the spirit of this invention are included within its scope as best defined by the appended claims.

What is claimed is:

1. Method of making a thermal transfer web, comprising:

providing a carrier web, wherein one side of the carrier web has a release coating both in one or more fixed-information zone(s) capable of receiving fixed information and in one or more variable information zone(s) capable of receiving variable information, printing fixed information over the release coating in the fixed-information zone(s) and adhesive over the printed fixed information, adhesive over the release coating in the variable-information zone(s), to form a partially printed thermal transfer web, winding the partially printed thermal transfer web into a single roll or several smaller rolls, passing the partially printed thermal transfer web from a roll to a printer, and using the printer to print variable information over the adhesive in the variable-information zone(s), with the fixed-information remaining constant over a product line and variable-information may vary from product to product within the product line.

2. Method as defined in claim 1, wherein the partially printed thermal transfer web is manufactured at one location and the printing of the variable information is performed at a different location.

3. Method as defined in claim 1, wherein the partially printed thermal transfer web is made and printed with variable information at the same manufacturing location.

4. Method as defined in claim 1, and using heat and pressure to transfer the printed fixed and variable information and the adhesive from the carrier web to a fabric.

5. Method of making a thermal transfer web, comprising:

providing a carrier web, wherein one side of the carrier web has a release coating both in one or more fixed-information zone(s) capable of receiving fixed information and in one or more variable information zone(s) capable of receiving variable information, printing fixed information over the release coating in the fixed-information zone(s) and adhesive over the printed fixed information, adhesive over the release coating in the variable-information zone(s), to form a partially printed thermal transfer web, and after the partially printed thermal transfer web has been made, printing variable information over the adhesive in the variable-information zone(s), with the fixed-information remaining constant over a product line and variable-information may vary from product to product within the product line.

6. Method as defined in claim 5, wherein the partially printed thermal transfer web is manufactured at one location and the printing of the variable information is performed at a different location.

7. Method as defined in claim 5, wherein the partially printed thermal transfer web is made and printed with variable information at the same manufacturing location.

8. Method as defined in claim 5, and using heat and pressure to transfer the printed fixed and variable information and the adhesive from the carrier web to a fabric.

9. Method of making a thermal transfer web with one or more fixed-information zone(s) capable of receiving printed fixed information and one or more variable information zone(s) capable of receiving printed variable information, comprising:

providing a carrier web, one side of the carrier web having a release coating in the fixed information zone(s) and the variable information zone(s), printing fixed information in the fixed information zone(s), the release coating being between the carrier web and the printed fixed information, adhesive over the printed fixed information in the fixed-information zone(s) and in the variable-information zone(s), to form a partially printed thermal transfer web, winding the partially printed thermal transfer web into a single roll or several smaller rolls, passing the partially printed thermal transfer web from a roll to a printer, using the printer to print variable information over the adhesive in the variable-information zone(s), with the fixed-information remaining constant over a product line and variable-information may vary from product to product within the product line.

10. Method as defined in claim 1, wherein the adhesive is a heat-activated adhesive.

11. Method as defined in claim 5, wherein the adhesive is a heat-activated adhesive.

* * * * *